United States Patent [19]

Lewis et al.

[11] Patent Number: 5,655,483
[45] Date of Patent: Aug. 12, 1997

[54] METHOD AND APPARATUS FOR CONTROLLING ZEBRA AND RELATED MUSSELS USING ULTRAVIOLET RADIATION

[75] Inventors: Donald Philips Lewis, Dundas; G. Elliott Whitby, Toronto, both of Canada

[73] Assignees: Aquatic Sciences Inc., St. Catharines; Elsag Bailey (Canada), Inc., Burlington, both of Canada

[21] Appl. No.: 411,131

[22] Filed: Mar. 27, 1995

[51] Int. Cl.$^6$ ................................. C02F 1/32
[52] U.S. Cl. ................ 119/720; 405/127; 210/748
[58] Field of Search ........................ 119/234, 720, 119/219; 405/127; 43/124; 210/748

[56] References Cited

U.S. PATENT DOCUMENTS

| | | | |
|---|---|---|---|
| 5,253,954 | 10/1993 | Landsberger | 405/127 |
| 5,294,351 | 3/1994 | Clum et al. | 405/127 X |
| 5,308,505 | 5/1994 | Titus et al. | 210/748 X |
| 5,320,749 | 6/1994 | Mullen | 210/748 X |
| 5,322,569 | 6/1994 | Titus et al. | 210/748 X |

*Primary Examiner*—Robert P. Swiatek
*Attorney, Agent, or Firm*—Michael M. Rickin

[57] ABSTRACT

A method for controlling zebra mussels and other bivalves using UV light at a wavelength of 254 nm. One or more low pressure UV lamps provide an intensity of UV light in the range of about 13,400 µW/cm$^2$ to about 22,300 µW/cm$^2$ in the water wherein the bivalves may be located. The one or more low pressure UV amps provide a dose of UV light in the range of about 0.08 W.sec/cm$^2$ to about 2.6 W.sec/cm$^2$ in the water wherein the bivalves may be located. The dose is provided for a period of time in the range from about 4.5 seconds to about 116 seconds.

17 Claims, 7 Drawing Sheets

METHOD AND APPARATUS FOR CONTROLLING ZEBRA AND RELATED MUSSELS USING ULTRAVIOLET RADIATION

FIELD OF THE INVENTION

This invention relates to the control of zebra mussels and more particularly to a method for using ultraviolet (UV) light to control zebra mussels.

DESCRIPTION OF THE PRIOR ART

Electrical power generating and industrial plants in the United States and Canada that border the Great Lakes use water from those lakes in performing their processes. However, the presence of the zebra mussel in the Great Lakes has affected the ability of such plants to obtain water from those lakes. Zebra mussels have also been found in the Ohio and Mississippi rivers and in the estuary of the St. Lawrence river. Another species of mussels, known as the quagga, has recently been identified in the Great Lakes.

Zebra mussel veligers reach a stage in their maturation wherein they settle and attach themselves to the surfaces of water intake and distribution piping systems of the electrical power generating and industrial plants thereby reducing the diameters of those pipes. In addition to veliger settlement, a new phenomenon which appears to be a year round activity, has recently been described. In this phenomenon, juvenile zebra mussels, known as translocators, detach themselves from their original substrate and reenter the water column. The translocators may be a further threat to service water systems if the juvenile zebra mussels are small enough to pass through screens and coarse filters and into the systems where they may settle again and grow.

The primary concern of water users is to prevent the colonization of water systems surfaces by the zebra mussel. Chemical oxidants, particularly chlorine, have been widely used in both the United States and Canada to combat such colonization. While these treatments appear to be very effective they do have some drawbacks.

Chlorination may result in the formation of byproducts that may be damaging to the aquatic environment and human health. In addition, the potential for over chlorination or spills poses a risk to aquatic life in the vicinity of the outfalls. Further there is the added cost to the water user of dechlorination and concern with meeting the effluent requirements of government agencies such as the Ontario Ministry of the Environment and Energy. Therefore, there are many water users who do not have the ability or the inclination to use chlorine or other chemicals to control zebra mussels.

One alternative to the use of chlorine is to use another oxidant or some other potentially toxic material. This alternative does not appear to be viable as it may give rise to new production, handling and long term environmental concerns which may be potentially more damaging than those already understood with chlorine.

Another alternative is to redesign water intake and distribution piping systems so as to minimize the ability of the zebra mussels to attach themselves to the surfaces of these systems. While this may be a long term solution to the problem, it is not economically feasible, in the short term, to replace present systems with redesigned systems. Therefore, it is desirable to have a new mechanism for controlling zebra mussels that is either non-chemical or reduces the amount of chemicals that are used and can immediately be put into effect without substantial economic impact.

One proposed non-chemical solution is the use of UV light. UV light is used throughout the world to disinfect air, water and surfaces and has recently become popular to treat large volumes of municipal wastewater. Ontario Hydro has shown that a flow through UV system using a single low pressure mercury lamp would prevent the downstream settlement of zebra mussels. However, Ontario Hydro did not investigate the dose of UV light needed to prevent settlement and the mechanism by which the UV light prevented the settlement of the mussels.

As is well known, a low pressure mercury lamp produces all of its UV light at a wavelength of 254 nm. This wavelength is readily absorbed by organic compounds that are in water. The light at a wavelength of 254 nm may also be absorbed by the surface cells or shells of the zebra mussels. This absorption would prevent the destruction of the zebra mussels' genetic material which is the primary target of UV light at 254 nm.

Therefore, it appeared that UV light might be effective in controlling zebra mussels. However, it was not known if UV light would be a viable economic alternative to chemical oxidants.

SUMMARY OF THE INVENTION

A method for controlling bivalves such as zebra mussels wherein a low pressure UV lamp assembly provides an intensity of UV light in the range of about 13,400 $\mu W/cm^2$ to about 22,300 $\mu W/cm^2$ in the water wherein the bivalves are located.

A method for controlling bivalves such as zebra mussels wherein a low pressure UV lamp assembly provides a dose of UV light in the range of about 0.08 $W.sec/cm^2$ to about 2.6 $W.sec/cm^2$ in the water wherein the bivalves are located.

An apparatus for treating water. The apparatus has a chamber having a quantity of the water therein water. A low pressure UV lamp assembly is located in the chamber to provide a light intensity of UV light in the range of about 13,400 $\mu W/cm^2$ to about 22,300 $\mu W/cm^2$ in the water.

An apparatus for treating water. The apparatus has a chamber having therein a quantity of the water. A low pressure UV lamp assembly is located in the chamber to provide a dose of UV light in the range of about 0.08 $W.sec/cm^2$ to about 2.6 $W.sec/cm^2$ for a period of time in the range from about 4.5 seconds to about 116 seconds in the water.

DESCRIPTION OF THE PREFERRED EMBODIMENT(S)

Figure 1:
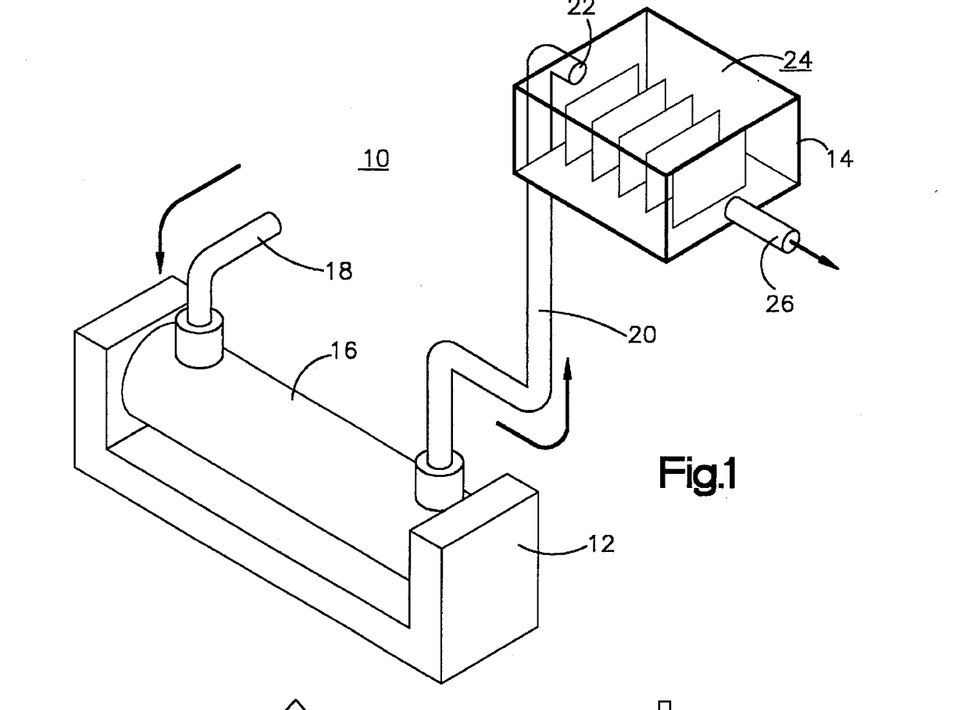
FIG. 1 shows a closed pipe system for performing a flow through test on the effect of UV light in controlling zebra mussels.

Referring now to FIG. 1, there is shown a closed pipe system 10 that was used to perform a flow through test to determine if UV light would economically control the settlement of zebra mussels. System 10 includes a UV contact fixture 12 and a settling chamber 14. The fixture 12 includes a UV contact chamber 16 wherein one or more low pressure mercury lamps were mounted. The fixture 12 further includes an inlet pipe 18 which is connected to receive the raw water that will be irradiated by the UV light and an outlet pipe 20 whereby the irradiated raw water leaves the fixture.

The outlet pipe 20 is connected to the inlet 22 of the settling chamber or tank 14. Vertically mounted in settling chamber 14 are a number of polyvinyl chloride (PVC) plates 24. While only five plates are shown in FIG. 1, system 10 actually had six plates. Chamber 14 also includes an outlet pipe 26.

Two systems identical to system 10 were constructed. The only difference between the two constructed systems was, as will be described below, the contents of contact chamber 16.

Figure 2A:
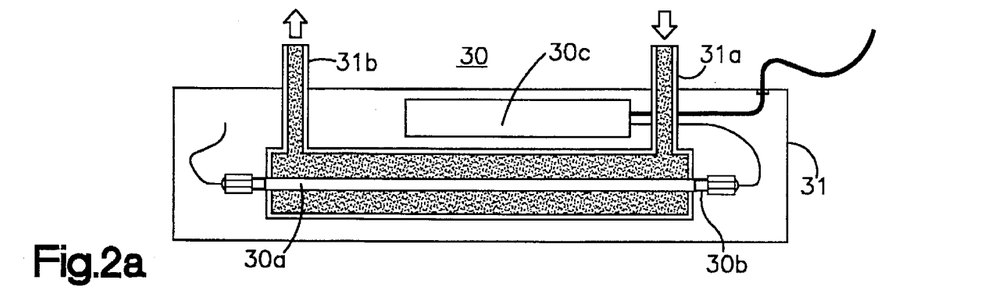
FIG. 2a shows the single low pressure UV lamp system mounted in the UV contact chamber of the first flow through test system.

In the first of the two constructed systems (hereinafter referred to as the "first UV system"), there was mounted in UV contact chamber 16 the single low pressure UV lamp system 30 shown in FIG. 2a. System 30 includes a housing 31, having a water inlet 31a and a water outlet 31b. The housing 31 has therein a low pressure lamp 30a surrounded by a quartz sleeve 30b which maintains the lamp at the proper operating temperature. Lamp 30a used 36 watts of input power to produce 13.8 watts of UV light at 254 nm after 100 hours of use. System 30 also includes a ballast 30c.

Figure 2B:
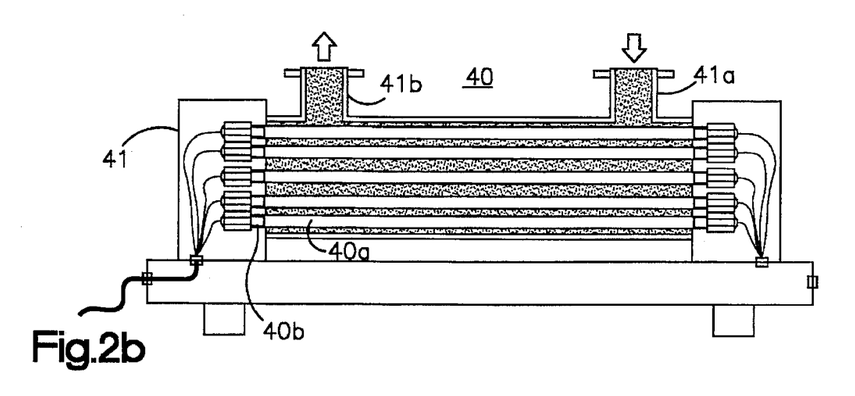
FIG. 2b shows the multiple low pressure UV lamp system mounted in the UV contact chamber of the second flow through test system.

In the second of the two constructed systems (hereinafter referred to as the "second UV system ") there was mounted in UV contact chamber 16 the low pressure lamp system 40 shown in FIG. 2b. System 40 includes a fixture 41 having a water inlet 41a and a water outlet 41b. Mounted on fixture 41 are eight (five are shown in FIG. 2b) horizontally arrayed low pressure UV lamps 40a each surrounded by a sheath 40b. Each of the eight lamps 40a used 65 watts of input power to produce 26.7 watts of UV light at 254 nm after 100 hours of use. Internal baffles, not shown, were used to mix the water to prevent short circuiting at low flow rates.

Figure 3A:
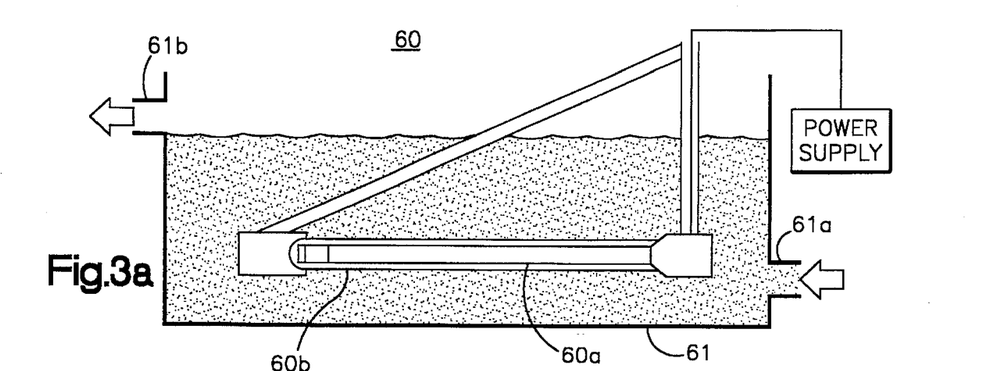
FIGS. 3a and 3b show side and top views, respectively, of the open channel single low pressure UV lamp system for performing a test on the effect of UV light in controlling zebra mussels.
Figure 3B:
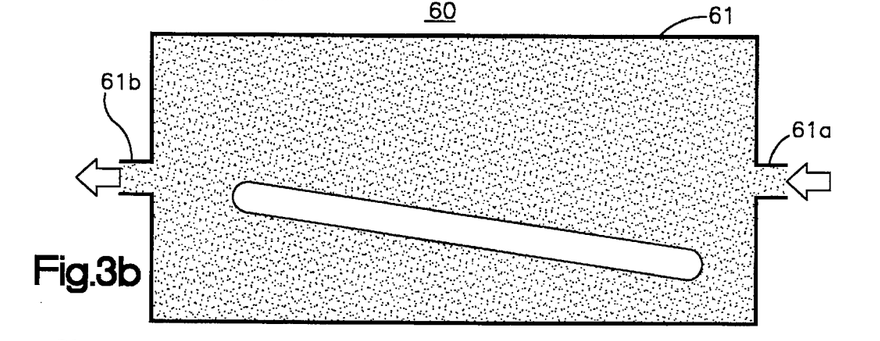

In addition to the two systems described above, there was constructed an open channel lamp system 60 (hereinafter referred to as the "open channel UV system"), the side and top views of which are shown in FIGS. 3a and 3b, respectively. The open channel system 60 includes a chamber 61 having a water inlet 61a and a water outlet 61b. The chamber 61 measured approximately 66×27×22 cm, was made from polycarbonate and had mounted therein a single low pressure UV lamp 60a enclosed in a quartz sleeve 60b. The lamp is essentially parallel to the flow of water along the length of the chamber. The depth of the water in the chamber was approximately 10 cm. The lamp 60a used 16 watts of power to produce 5.3 watts of UV light at 254 nm after 100 hours of use. In effect, system 60 may be thought of as a system 10 without a contact chamber 12 and wherein the UV lamp is placed directly in the settling chamber 14.

In addition to the three systems described above, there was constructed two systems (not shown) identical to system 10 and one system identical to system 60 except that there wasn't any UV lamp(s) in these systems. These systems acted as the control for the three UV systems.

The initial water flows to each of the three systems, UV and control, were as follows:

first system—3–4 L/min;
second system—10 L/min; and
open channel system—7–10 L/min.

The three systems, UV and control, were operated over the period starting at the end of June and ending in mid October. During the period of operation the flow rates remained constant.

In each of the systems, a filtered water sample of 20 liter was taken at the effluent of each settling chamber 14 in a UV system and in a control system three times per week. The sample was analyzed for the presence, age, density and mortality of free swimming veligers and post veligers. The PVC plates 24 in each settling chamber 14 were scraped and analyzed for settled mussels at the end of the operation of the three systems in mid October. After termination of the operation of the three systems, scrapings were taken from the walls of the settling chamber 14 and analyzed for the presence of settled zebra mussels.

At the end of the operation of the three systems, the control and test settling tanks for the second system was cleaned out and the system including the UV lamps was restarted. A five day sediment analysis, the results of which are described below, was performed for the purpose of determining whether the zebra mussel larvae were being removed from the water column at this point. Sediment from a known area was collected from the settling chamber bottom following the five day period.

During the operating period of the three systems the average UV transmission at the 254 nm wavelength was 95%. As is well known to those skilled in the art, the average UV transmission is a measure, in percent, of how well the water in which the UV lamp(s) are immersed transmits the UV light with 100% indicating that the water transmits all of the UV light emitted from the lamp(s).

Figure 4:
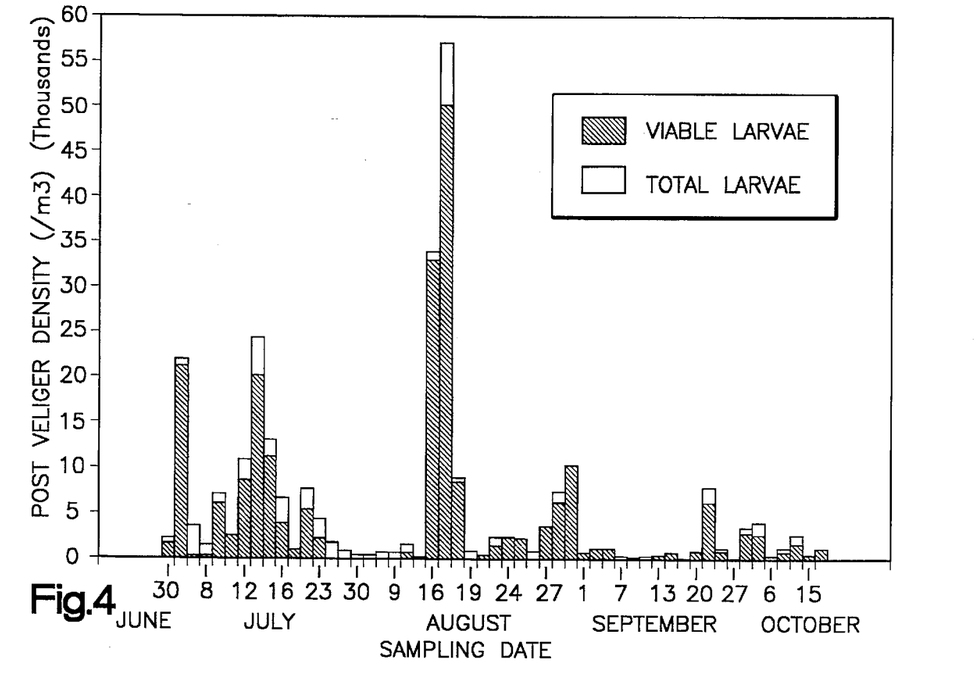
FIG. 4 shows the post veliger density and relative viable proportion at the head tank water flow.

Referring now to FIG. 4, there is shown the post veliger density and relative viable proportion of zebra mussels at a head tank (not shown) which provided the feedwater for the three systems, UV and control. In the post veliger period the zebra mussel develops a foot covered in cilia which it uses to move along surfaces until it attaches to a surface.

One of the results obtained for each of the three UV systems during the period of operation was the intensity of UV light and the dose of UV light that the zebra mussels were exposed to in passing through the contact chamber 16. It is well known that dose and intensity are related as follows:

$$Dose = Intensity \times Time.$$

wherein Time is the time of exposure of the zebra mussels to the UV light in seconds, Intensity is measured in $W/cm^2$, and Dose is measured in $W.sec/cm^2$.

The results of the operation of the three UV and control systems will now be described.

The First System

Figure 5A:
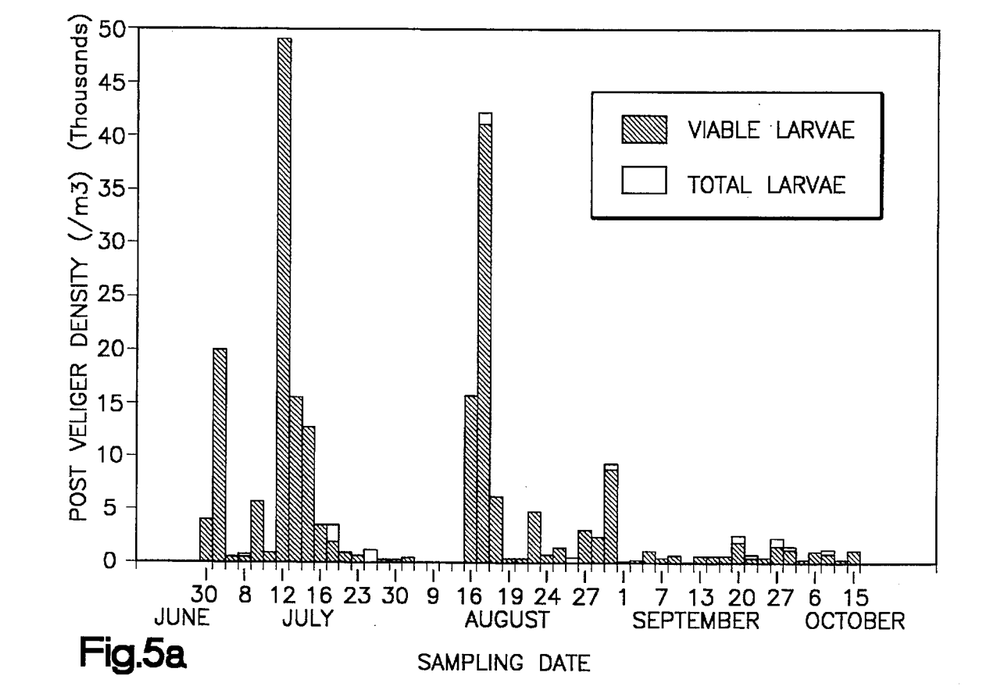
FIGS. 5a and 5b, show the post veliger density and relative viable proportion in the first test system, control and UV, respectively.
Figure 5B:
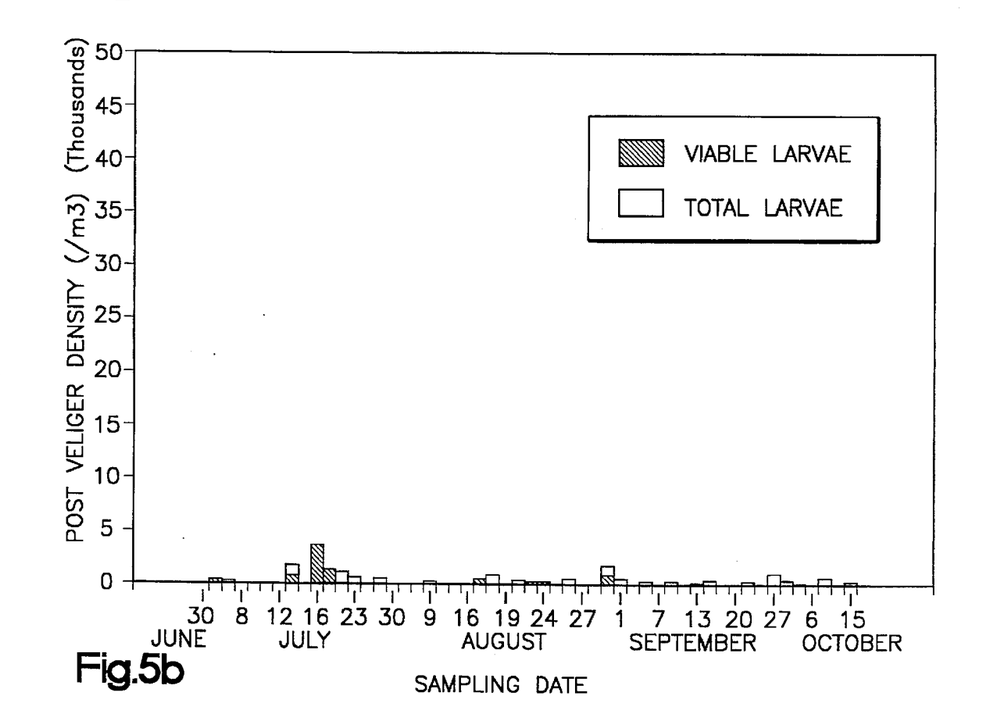

Referring now to FIGS. 5a and 5b, there are shown the total post veliger densities and relative viable proportions for the first system, control and UV, respectively. As can be seen from FIG. 5b, the post veliger densities at the settling tank effluent for the UV system were generally in the order of less than $1,000/m^3$ except for a peak in mid July caused by the nonoperation of the UV lamp without a termination of flow. In contrast, and as can be seen from FIG. 6a, the post veliger densities at the control system settling tank effluent were much higher. These densities frequently exceeded $10,000/m^3$ and reached a peak of $49,000/m^3$.

As can also be seen from a comparison of FIGS. 5a and 5b, the relative proportion of viable post veligers to total post veligers was substantially lower in the UV system than in the control system. That percentage was less than 50% in the samples taken from the UV system (except for mid July for the reasons described above) while that percentage was in the 80% to 100% range for the samples taken from the control system.

Figure 5C:
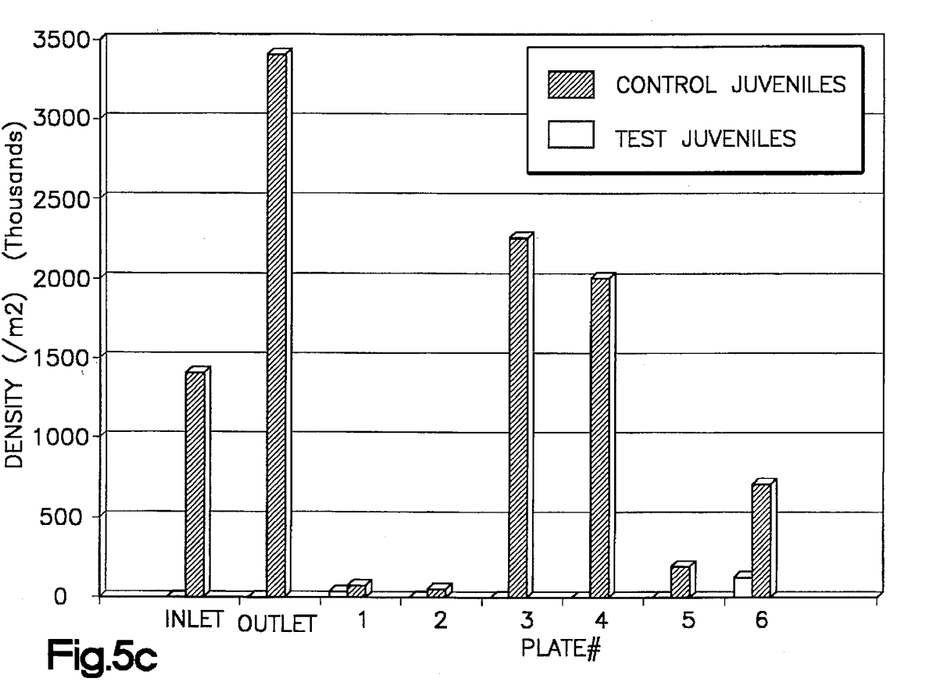
FIG. 5c shows the average density of scrapings of juvenile mussels taken during the test from the settling chamber of the first test system, UV and control.

The average densities of scrapings of juvenile mussels taken after the period of operation from various locations in the settling chamber 14 for the first system, UV and control, are shown in FIG. 5c. As can be seen, the average densities of juvenile mussels in the UV system was extremely low. A sample of scrapings taken late in July in the UV system showed a number of live settled juvenile zebra mussels. However, that settling followed the period of nonoperation of the UV lamp described above. Based on the flow rate in this system of 10 L/min, the post exposure contact time in the settling tanks was estimated to be 2.7 minutes.

The UV dose in this system was approximately 0.08 $W.sec/cm^2$. The time of exposure of the zebra mussels to the UV light was 4.5 seconds. Therefore, the UV intensity in this system is 17,750 $\mu W/cm^2$.

The Second System

Figure 6A:
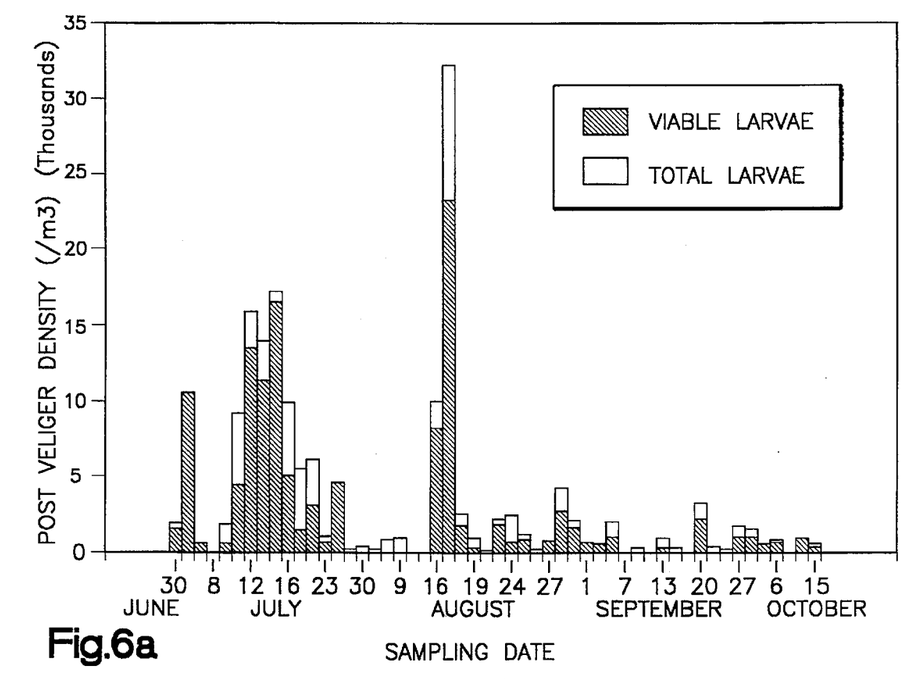
FIGS. 6a and 6b, show the post veliger density and relative viable proportion in the second test system, control and UV, respectively.
Figure 6B:
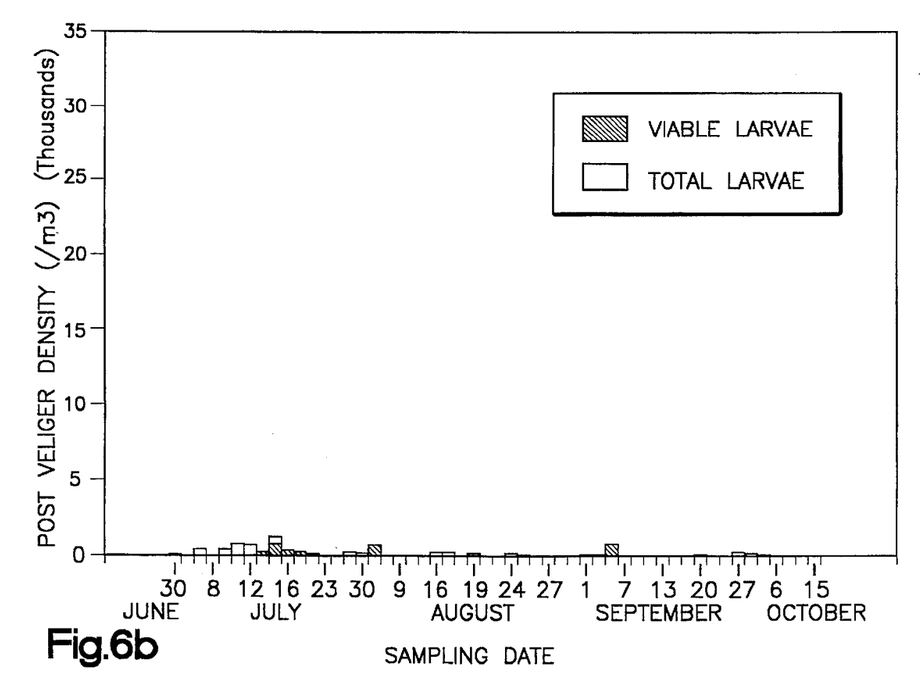

Referring now to FIGS. 6a and 6b, there are shown the total post veliger densities and relative viable proportions for the second system, control and UV, respectively. As can be seen from FIG. 6b, the post veliger densities at the settling tank effluent for the UV system were consistently below $1,000/m^3$ except for a peak in mid July of $1,300/m^3$. In contrast, and as can be seen from FIG. 6a, the post veliger densities at the control system settling tank effluent were much higher. These densities were almost always above $10,000/m^3$ and reached a peak of $32,000/m^3$.

As can also be seen from a comparison of FIGS. 6a and 6b, the relative proportion of viable post veligers to total post veligers was substantially lower in the UV system than in the control system. However, that relative proportion is insignificant for this system due to the extremely low densities observed in the settling chamber of the UV system.

Figure 6C:
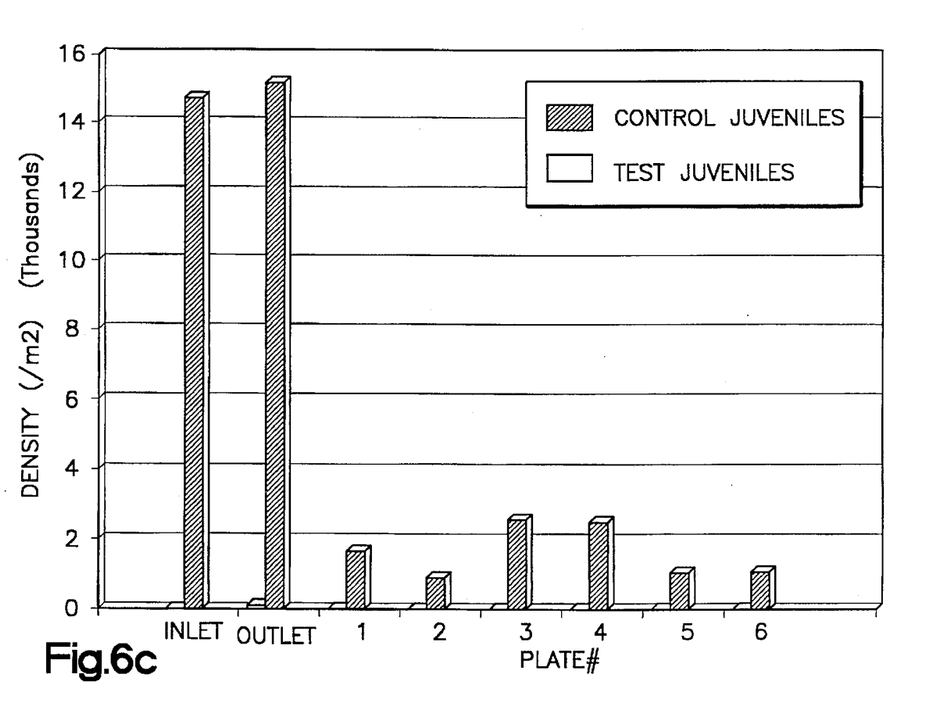
FIG. 6c shows the average density of scrapings of juvenile mussels taken during the test from the settling chamber of the second test system, UV and control.

The average densities of scrapings of juvenile mussels taken after the period of operation from various locations in the settling chamber 14 for the second system, UV and control, are shown in FIG. 6c. As can be seen, no settled juvenile mussels were detected in the scrapings from the UV system. The scrapings from the control system showed settled juvenile zebra mussels ranging from $800/m^2$ up to $2500/m^2$. Based on the flow rate in this system of 10 L/min, the post exposure contact time in the settling tanks was estimated to be 2.7 minutes.

The UV dose in this system was approximately 2.6 $W.sec/cm^2$. The time of exposure of the zebra mussels to the UV light was 116.6 seconds. Therefore, the UV intensity in this system is 22,300 $\mu W/cm^2$.

The Open Channel System

Figure 7A:
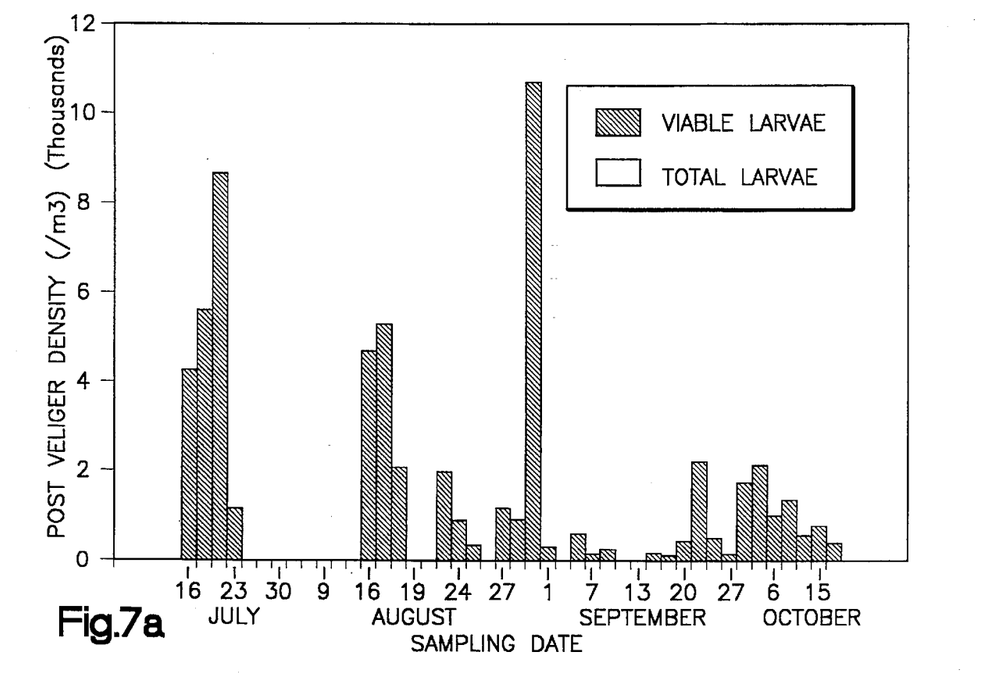
FIGS. 7a and 7b, show the post veliger density and relative viable proportion in the open channel test system, control and UV, respectively.
Figure 7B:
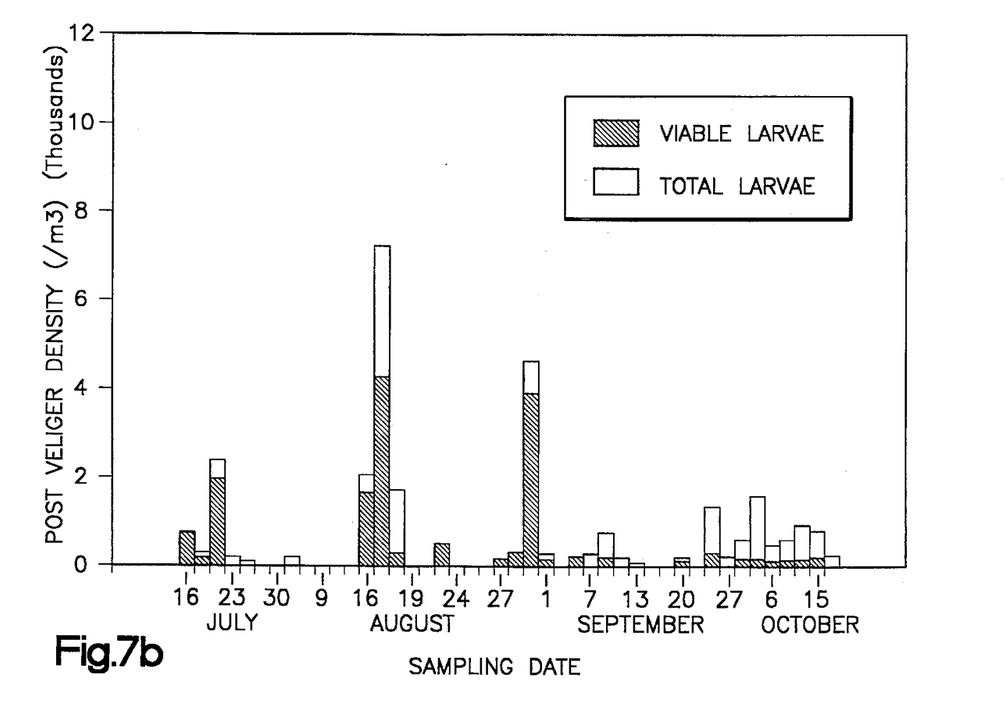

Referring now to FIGS. 7a and 7b, there are shown the total post veliger densities and relative viable proportions for the open channel system, control and UV, respectively. As can be seen from FIG. 7b, the post veliger densities at the settling tank effluent for the UV system were less than $4,000/m^3$ during July and August except for a peak of approximately $7,300/m^3$ detected in a sample taken in mid August and less than $2,000/m^3$ during September and October. In contrast, and as can be seen from FIG. 7a, the post veliger densities at the control system settling tank effluent were much higher. These densities reached a peak of about 10,000/at the end of August.

As can also be seen from a comparison of FIGS. 7a and 7b, the relative proportion of viable post veligers to total post veligers was substantially higher in the control system than in the UV system. That percentage in samples taken from the UV system decreased dramatically to less than 20% in October while that percentage was equal to 100% on most occasions for the samples taken from the control system.

Figure 7C:
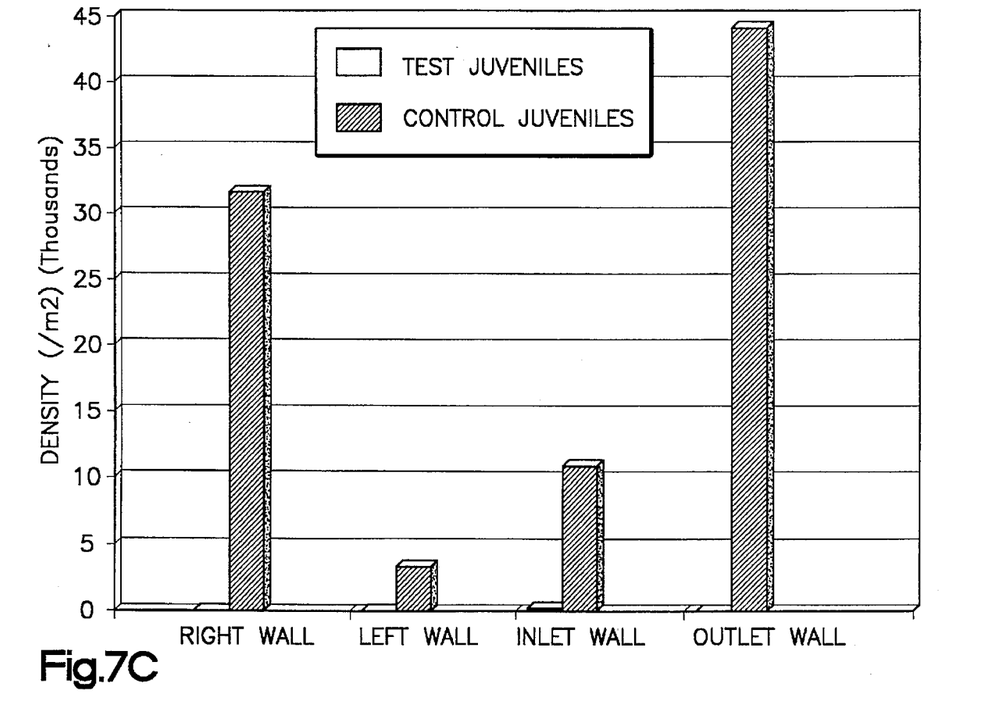
FIG. 7c shows the average density of scrapings of juvenile mussels taken during the test from the settling chamber of the open channel test system, UV and control.

The average densities of juvenile mussels observed after the period of operation from the walls in the settling chamber 14 for the open channel system, UV and control, are shown in FIG. 7c. As can be seen, 109 juveniles/$m^2$ were observed on the inlet wall at the furthest point from the UV lamp. No other juveniles were observed in the UV system. The observations in the control system showed settled juvenile zebra mussels ranging from $3,200/m^2$ up to almost $45,000/m^2$.

Since the lamp was placed directly in the settling chamber, post exposure contact time is not applicable for this test apparatus. Because the UV lamp was not situated in a central position in the chamber perfectly parallel to the flow in the tank, the relative intensities of UV exposure differed throughout the tank. The average intensity in the water column between the lamp and the furthest point in the tank was 13,400 $\mu W/cm^2$. The intensity between the lamp and the walls parallel to the lamp was 15,700 $\mu W/cm^2$. The UV intensity at the furthest point from the lamp, which was 19.5 cm, was 1,900 $\mu W/cm^2$.

Sediment Analysis

When zebra mussel infestations are treated by oxidants, a phenomenon known as inactivation occurs. In that phenomena, zebra mussel larvae in the post veliger stage detect the oxidant and close their valves. The larvae can no longer use their cilia to maintain themselves in the water column and as the post veliger larvae are heavier than other larvae they settle through the process of sedimentation. A five day trial was run on the second system after the period of operation of the three systems in order to determine if sedimentation was occurring with UV treatment.

Figure 8:
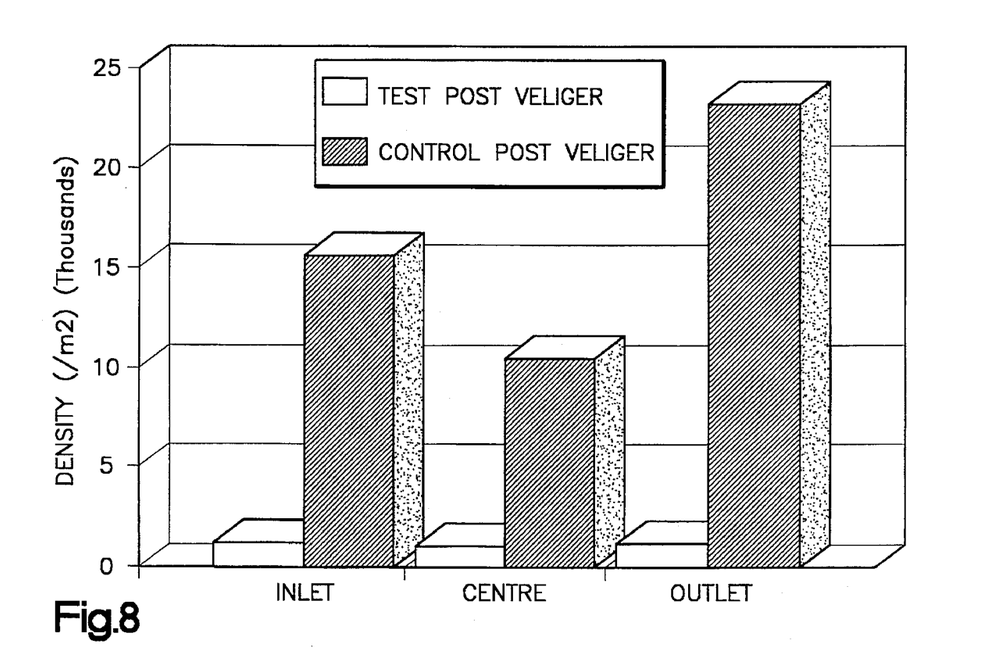
FIG. 8 shows the sediment analysis performed on the second test system.

The five day sediment analysis verified that the inactivation phenomena also occurred in the UV treatment. FIG. 8, shows the sediment analysis for the second system. FIG. 8 shows that in the second system the number of post veligers detected in the sediment from the UV system was much less than the number detected in the sediment from the control system.

It is to be understood that the description of the preferred embodiment(s) is (are) intended to be only illustrative, rather than exhaustive, of the present invention. Those of ordinary skill will be able to make certain additions, deletions, and/or modifications to the embodiment(s) of the disclosed subject matter without departing from the spirit of the invention or its scope, as defined by the appended claims.

What is claimed is:

1. A method for controlling bivalves such as zebra mussels in water comprising providing from a low pressure UV lamp assembly an intensity of UV light in the range of about 13,400 µW/cm$^2$ to about 22,300 µW/cm$^2$ in said water wherein said bivalves are located.

2. The method of claim 1 wherein said low pressure UV lamp assembly is a single low pressure UV lamp.

3. The method of claim 1 wherein said low pressure lamp assembly comprises a multiplicity of low pressure UV lamps.

4. A method for controlling bivalves such as zebra mussels in water comprising providing from a low pressure UV lamp assembly a dose of UV light in the range of about 0.08 W.sec/cm$^2$ to about 2.6 W.sec/cm$^2$ in said water wherein said bivalves are located.

5. The method of claim 4 wherein said low pressure UV lamp assembly is a single low pressure UV lamp.

6. The method of claim 4 wherein said low pressure lamp assembly comprises a multiplicity of low pressure UV lamps.

7. The method of claim 4 wherein said dose is provided for a period of time in the range from about 4.5 seconds to about 116 seconds.

8. An apparatus for treating water comprising:

(a) a chamber having a quantity of said water therein; and (b) a low pressure UV lamp assembly located in said chamber, said lamp assembly providing an intensity of UV light in the range of about 13,400 µW/cm$^2$ about 22,300 µW/cm$^2$ in said water.

9. The apparatus of claim 8 wherein said low pressure UV lamp assembly is a single low pressure UV lamp.

10. The apparatus of claim 8 wherein said low pressure UV lamp assembly comprises a multiplicity of low pressure UV lamps.

11. The apparatus of claim 8 wherein said chamber is a closed pipe having an inlet for allowing additional quantities of said water to enter said chamber and an outlet for allowing said water exposed to said UV light to exit said chamber.

12. The apparatus of claim 8 wherein said chamber is an open channel having an inlet for allowing additional quantities of said water to enter said chamber and an outlet for allowing said water exposed to said UV light to exit said chamber.

13. An apparatus for treating water comprising:

(a) a chamber having a quantity of said water therein; and (b) a low pressure UV lamp assembly located in said chamber, said lamp assembly providing a dose of UV light in the range of about 0.08 W.sec/cm$^2$ to about 2.6 W.sec/cm$^2$ for a period of time in the range from about 4.5 seconds to about 116 seconds in said water.

14. The apparatus of claim 13 wherein said low pressure UV lamp assembly is a single low pressure UV lamp.

15. The apparatus of claim 13 wherein said low pressure UV lamp assembly comprises a multiplicity of low pressure UV lamps.

16. The apparatus of claim 13 wherein said chamber is a closed pipe having an inlet for allowing additional quantities of said water to enter said chamber and an outlet for allowing said water exposed to said UV light to exit said chamber.

17. The apparatus of claim 13 wherein said chamber is an open channel having an inlet for allowing additional quantities of said water to enter said chamber and an outlet for allowing said water exposed to said UV light to exit said chamber.

* * * * *